United States Patent Office 2,886,527
Patented May 12, 1959

2,886,527

ELECTROLYTE FOR ELECTROLYTIC CONDENSER

Henry S. Myers, Brooklyn, N.Y., assignor to Power Condenser & Electronics Corporation, Boston, Mass., a corporation of Massachusetts No Drawing. Application January 24, 1955
Serial No. 483,815

9 Claims. (Cl. 252—62.2)

This invention relates to a novel type of electrolyte for use in electrolytic capacitors and is especially useful in capacitors that are intended to be used in alternating current circuits.

It has been recognized for many years that metals such as aluminum and tantalum can be anodized to provide an extremely thin oxide film thereon having excellent dielectric properties and that metal foils having such films thereon can be advantageously employed in the manufacture of capacitors. Electrolytic capacitors employing filmed electrodes of this type in conjunction with so-called "dry" electrolytes have been extensively used commercially in direct current circuits.

Theoretically the same principle can be employed in capacitors to be used in A.C. circuits for power factor correction and other purposes. However, when such capacitors were introduced into A.C. circuits a number of problems were encountered which have delayed the general use of these capacitors for alternating current applications. The anodized film because of its extreme thinness is readily abraded and can be easily destroyed by a variety of electro-chemical and chemical reactions. Removal of the film from a very small area of the electrode seriously impairs the efficiency of the capacitor. When such capacitors are used in A.C. circuits it is evident that during half of each cycle the conditions at the filmed electrode are such as to favor removal of the oxidized film. In practice it was found that such capacitors deteriorate over a period of time and do not possess either a low enough power factor or sufficient electro-chemical irreversibility to be used for continuous duty in alternating current circuits.

Many modifications and variations of these capacitors have been proposed, and in recent years a relatively successful capacitor has been developed which employs a non-aqueous electrolyte comprising a ketone or aldehyde solvent and an auxiliary rectifier arrangement to maintain a direct current positive bias on the anodes and thereby prevent progressive deterioration of the oxide film thereon. Capacitors incorporating such an anhydrous electrolyte and employing the auxiliary rectifier arrangement have been built and have had power factors of 2% or less and satisfactory stability for continuous duty A.C. service under certain conditions. However, under other conditions, as for example where the capacitor is to be used at an elevated ambient temperature or under such conditions that the capacitor heats up substantially, certain difficulties are encountered which stem largely from the properties of the ketone or aldehyde solvent used. Thus these compounds in general have low flash points and high volatilities. Hence at elevated temperatures, they tend to increase the pressure in the capacitor, thereby increasing the tendency toward vapor leakage therefrom. Moreover if the capacitor is operated under such conditions that leakage of these vapors occurs, an explosion hazard is created because of the low-flash points of the compounds.

In order to avoid these disadvantages, the substitution of high molecular weight ketones and aldehydes having higher boiling points and flash points has been proposed and tried, but this substitution was not successful because the use of such higher molecular weight solvents diminishes the A.C. stability of the capacitor and increases its power factor.

It is accordingly an object of the present invention to provide a capacitor which has a low power factor and satisfactory stability for continuous duty alternating current service and which is at the same time capable of retaining these characteristics over a relatively wide temperature range including both relatively low and relatively high temperatures. It is another object of the invention to provide an electrolyte suitable for use in alternating current capacitors and which is composed entirely of materials of low volatility which either have high flash-points or are essentially inert toward atmospheric oxidation except under extreme conditions. Other objects of the invention will be in part obvious and in part pointed out hereafter.

In general an electrolyte composition prepared according to the present invention comprises a relatively weak organic acid, an organic liquid which may be called a "solvent" and which is selected from the group consisting of polyhydric alcohols and their ethers, and a salt of an organic acid which is capable of being dissolved in and ionizes in the mixture of acid and solvent to provide metallic cations in the electrolyte. The organic acid salt, as well as the other components of the electrolyte, is preferably free from nitrogen. The preferred salts are salts of the alkali metals i.e. sodium, potassium, lithium, etc. The preferred acidic component is phenol, and when phenol is used the salt can conveniently be an alkali metal phenolate such as sodium phenolate.

The polyhydric alcohol or ether is added to the acid and salt in a sufficient amount to form a fluid mixture. Although the polyhydric alcohol or ether is referred to herein as a "solvent," it need not be present in major proportion in the mixture, and as indicated in the specific examples given below is preferably present in minor proportion in the composition. Among the solvents that are useful in the present composition are ethylene glycol, diethylene glycol, glycerine and the ethers of these polyhydric alcohols such as the methyl, ethyl, propyl, butyl, amyl and hexyl ethers, that is, ethers wherein the hydrocarbon ether-forming radical contains from 1 to 6 carbon atoms.

The proportions of the three constituents of the electrolyte described above can vary considerably. As previously indicated the acid is preferably present as a major component of the mixture and may comprise from 55% to 95% by weight thereof. The salt on the other hand is preferably present in a relatively small amount, say 0.1 to 5% by weight. More generally the quantity of salt used is such as to provide an electrolyte having a desired conductivity e.g. a specific resistivity of 2000 to 4000 ohm-centimeters. The remainder of the mixture is solvent and the solvent may vary from about 5% to 45% by weight of the mixture.

In order to point out more fully the nature of the present invention a number of specific examples are given below of compositions prepared according to the present invention. The compositions described in the examples were tested to determine their flash-point and resistivity immediately upon their formation prior to aging. Also the power factor of each composition was determined under standard conditions by immersing in the composition as an anode an aluminum foil having an oxide film thereon formed by application of a 200-volt direct current thereto. The results of these tests are listed in the several examples.

EXAMPLE 1

| Composition, Wt. in grams | | Flash Point, °C. | Resistivity, Ohm-cms. | Power Factor, Percent |
|---|---|---|---|---|
| Phenol | 130 | 92 | 2,970 | 2.7 |
| Sod. Phenolate | 4 | | | |
| Diethylene glycol monoethyl ether | 40 | | | |

EXAMPLE 2

| Phenol | 130 | 91 | 3,890 | 2.7 |
|---|---|---|---|---|
| Sod. Phenolate | 4 | | | |
| Diethylene glycol monoethyl ether | 40 | | | |

EXAMPLE 3

| Phenol | 132 | 91 | 3,250 | 2.7 |
|---|---|---|---|---|
| Sod. Phenolate | 6 | | | |
| Diethylene glycol monobutyl ether | 40 | | | |

EXAMPLE 4

| Phenol | 130 | 88 | 3,050 | 2.2 |
|---|---|---|---|---|
| Sod. Phenolate | 5 | | | |
| Ethylene glycol | 20 | | | |

EXAMPLE 5

| Phenol | 130 | | 3,000 | 2.2 |
|---|---|---|---|---|
| Sod. Phenolate | 5 | | | |
| Diethylene glycol | 20 | | | |

EXAMPLE 6

| Phenol | 120 | | 3,420 | 2.8 |
|---|---|---|---|---|
| Sod. Phenolate | 5 | | | |
| Glycerine | 20 | | | |

EXAMPLE 7

| Ortho-Chloro-Phenol | 120 | | 3,120 | 2.7 |
|---|---|---|---|---|
| Sod. Phenolate | 6 | | | |
| Diethylene glycol monoethyl ether | 40 | | | |

EXAMPLE 8

| Phenol | 130 | | 2,220 | 3 |
|---|---|---|---|---|
| Sod. Phenolate | 6 | | | |
| Mixed Polyethylene Glycols of about 400 molecular wt. | 20 | | | |

EXAMPLE 9

| Phenol | 60 | | 2,400 | 2.7 |
|---|---|---|---|---|
| Sod. Phenolate | 2 | | | |
| Ethylene glycol Monomethyl ether | 40 | | | |

EXAMPLE 10

| Phenol | 60 | | 2,100 | 3 |
|---|---|---|---|---|
| Sod. Phenolate | 8 | | | |
| Ethylene Glycol n-hexyl ether | 20 | | | |

EXAMPLE 11

| Phenol | 60 | | 2,600 | 3.1 |
|---|---|---|---|---|
| Sod. Phenolate | 8 | | | |
| Diethylene Glycol n-hexyl ether | 40 | | | |

From the foregoing description it will be apparent that the present invention provides a group of electrolytes which permit the achievement of the several objectives set forth at the beginning of the present specification. The compositions disclosed have resistivities within the desired range of 2000 to 4000 ohm-centimeters and capacitors incorporating these electrolytes have relatively low power factors which they retain for extended periods of time when properly connected in A.C. circuits. Moreover such capacitors are useful over an exceptionally wide temperature range. Thus the polyhydric alcohols and their ethers possess antifreeze properties that permit capacitors containing the present electrolytes to be used at relatively low temperatures. On the other hand all components of the electrolyte have low volatilities and hence may be satisfactorily used at relatively high temperatures or under conditions such that the capacitor tends to heat up in use.

It is of course to be understood that the foregoing examples are illustrative only and that numerous changes can be made in the ingredients and proportions disclosed without departing from the spirit of the invention as defined in the appended claims.

I claim:

1. A substantially anhydrous electrolyte adapted to be incorporated in an electrolytic capacitor for use over a relatively wide temperature range, said electrolyte being essentially composed of a major proportion of phenol, an organic liquid selected from the group consisting of ethers of polyhydric alcohols wherein the ether-forming radical contains from 1 to 6 carbon atoms, and a small amount of an alkali metal phenolate.

2. An electrolyte according to claim 1 and wherein said organic liquid is diethylene glycol monomethyl ether.

3. An electrolyte according to claim 1 and wherein said organic liquid is diethylene glycol monoethyl ether.

4. An electrolyte according to claim 1 and wherein said organic liquid is diethylene glycol monobutyl ether.

5. A substantially anhydrous electrolyte adapted to be incorporated in an electrolytic capacitor for use over a relatively wide temperature range, said electrolyte comprising 55 to 95% by weight of phenol, 0.1 to 5% by weight of an alkali metal salt of a weak organic acid, and the remainder being essentially an organic liquid selected from the group consisting of ethers of polyhydric alcohols wherein the ether-forming radical contains from 1 to 6 carbon atoms.

6. A substantially anhydrous electrolyte adapted to be incorporated in an electrolytic capacitor for use over a relatively wide temperature range, said electrolyte being essentially composed of 55 to 95% by weight of phenol, 0.1 to 5% by weight of an alkali metal phenolate, and 5 to 40% by weight of an organic liquid selected from the group consisting of ethers of polyhydric alcohols wherein the ether-forming radical contains from 1 to 6 carbon atoms.

7. An electrolyte according to claim 6 and wherein said organic liquid is diethylene glycol monomethyl ether.

8. An electrolyte according to claim 6 and wherein said organic liquid is diethylene glycol monoethyl ether.

9. An electrolyte according to claim 6 and wherein said organic liquid is diethylene glycol monobutyl ether.

References Cited in the file of this patent

UNITED STATES PATENTS

| 2,031,793 | Robinson | Feb. 25, 1936 |
| 2,036,669 | Yngve | Apr. 7, 1936 |
| 2,089,684 | Clark | Aug. 10, 1937 |
| 2,089,687 | Clark et al. | Aug. 10, 1937 |
| 2,164,742 | Harding | July 4, 1939 |
| 2,206,430 | Robinson | July 2, 1940 |

FOREIGN PATENTS

| 387,437 | Great Britain | Feb. 9, 1933 |